(12) United States Patent
Murase et al.

(10) Patent No.: US 10,773,498 B2
(45) Date of Patent: Sep. 15, 2020

(54) LAMINATE FILM AND PACKAGING BAG

(71) Applicant: TOPPAN PRINTING CO., LTD., Tokyo (JP)

(72) Inventors: Tomokazu Murase, Tokyo (JP); Junpei Hayashi, Tokyo (JP); Shigekazu Yasutake, Tokyo (JP); Ryukichi Matsuo, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 136 days.

(21) Appl. No.: 15/798,649

(22) Filed: Oct. 31, 2017

(65) Prior Publication Data

US 2018/0311938 A1    Nov. 1, 2018

Related U.S. Application Data

(63) Continuation of application No. PCT/JP2016/065800, filed on May 27, 2016.

(30) Foreign Application Priority Data

May 28, 2015 (JP) ................. 2015-108610
May 28, 2015 (JP) ................. 2015-108612

(51) Int. Cl.
*B32B 27/08* (2006.01)
*B65D 65/40* (2006.01)
(Continued)

(52) U.S. Cl.
CPC ............. *B32B 27/08* (2013.01); *B32B 7/12* (2013.01); *B32B 27/10* (2013.01); *B32B 27/20* (2013.01);
(Continued)

(58) Field of Classification Search
CPC .......... B32B 27/08; B32B 7/12; B32B 27/10; B32B 27/20; B32B 27/32; B32B 27/40; B32B 2307/4023; B32B 2255/28; B32B 2264/102; B32B 2307/518; B32B 2264/104; B32B 2255/10; B32B 2255/20; B32B 2307/412; B32B 2307/5825; B32B 2307/7244; B32B 2439/46; B65D 65/40;
(Continued)

(56) References Cited

FOREIGN PATENT DOCUMENTS

EP    1 563 989 A1    8/2005
JP       3002339        1/2000
(Continued)

OTHER PUBLICATIONS

International Search Report issued in International Patent Application No. PCT/JP2016/065800 dated Jul. 5, 2016.
(Continued)

*Primary Examiner* — Michael C Miggins
(74) *Attorney, Agent, or Firm* — Foley & Lardner LLP

(57) ABSTRACT

The present disclosure relates to a laminate film for packaging. A laminate film according to an aspect of the present disclosure includes: a resin substrate having a heat sealing surface that constitutes one outermost surface of the laminate film; a coating layer made of a non-metallic material; and an underlayer disposed between the resin substrate and the coating layer. The resin substrate includes a first layer that is made of olefin copolymer and constitutes the heat sealing surface, and a second layer made of polypropylene, and the first and second layers are laminated and biaxially stretched.

11 Claims, 7 Drawing Sheets

(51) Int. Cl.
*C08J 7/04* (2020.01)
*B32B 7/12* (2006.01)
*B32B 27/10* (2006.01)
*B32B 27/20* (2006.01)
*B32B 27/32* (2006.01)
*B32B 27/40* (2006.01)

(52) U.S. Cl.
CPC .............. *B32B 27/32* (2013.01); *B32B 27/40* (2013.01); *B65D 65/40* (2013.01); *C08J 7/042* (2013.01); *C08J 7/0423* (2020.01); *B32B 2255/10* (2013.01); *B32B 2255/20* (2013.01); *B32B 2255/28* (2013.01); *B32B 2264/102* (2013.01); *B32B 2264/104* (2013.01); *B32B 2307/4023* (2013.01); *B32B 2307/412* (2013.01); *B32B 2307/518* (2013.01); *B32B 2307/5825* (2013.01); *B32B 2307/7244* (2013.01); *B32B 2439/46* (2013.01); *C08J 2323/10* (2013.01); *C08J 2429/04* (2013.01); *C08J 2475/14* (2013.01)

(58) Field of Classification Search
CPC ...... C08J 7/042; C08J 7/0423; C08J 2429/04; C08J 2475/14; C08J 2323/10
See application file for complete search history.

(56) References Cited

FOREIGN PATENT DOCUMENTS

| JP | 2002-316381 | 10/2002 |
| JP | 2004-217766 A | 8/2004 |
| JP | 2004-331460 A | 11/2004 |
| JP | 2004-351834 A | 12/2004 |
| JP | 2005-349582 | 12/2005 |
| JP | 2008-044202 | 2/2008 |
| JP | 4120227 | 7/2008 |
| JP | 2015-044627 | 3/2015 |

OTHER PUBLICATIONS

Extended European Search Report dated Jan. 4, 2019 in corresponding application No. 16800135.2.

LAMINATE FILM AND PACKAGING BAG

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/065800, filed on May 27, 2016, which is based upon and claims the benefit of priority of Japanese Patent Application No. 2015-108610, filed on May 28, 2015 and Japanese Patent Application No. 2015-108612, filed on May 28, 2015, the entireties of which are hereby incorporated by reference.

TECHNICAL FIELD

The present disclosure relates to a laminate film for packaging and a packaging bag produced by using the same.

BACKGROUND ART

A resin film having heat sealing characteristics is known as a film used for producing packaging bags (see PTLs 1 and 2). Packaging bags that contain contents such as food products are required to have gas barrier properties that suppress permeation of oxygen and water vapor from the air in order to lessen or prevent degradation in quality of the contents.

CITATION LIST

Patent Literature

PTL 1: JP 3002339 B
PTL 2: JP 4120227 B

SUMMARY OF THE INVENTION

Technical Problem

Resin films used for production of packaging bags are not necessarily required to have high sealing properties, but may have appropriate sealing properties depending on the contents. For example, films for packaging candies, which are not likely to be degraded immediately, may have lower sealing properties than those of packaging films for food products which are easily degraded. Rather, user convenience such as ease of opening may be prioritized.

Accordingly, an object of the present invention is to provide a laminate film useful for efficiently producing packaging bags that can be easily opened by hand and have gas barrier properties, and a packaging bag produced by using the same.

Solution to Problem

A laminate film for packaging according to the present disclosure at least includes a resin substrate having a heat sealing surface that constitutes one of outermost surfaces of the laminate film, and a coating layer made of a non-metallic material. Since the resin substrate of the laminate film has heat sealing characteristics, a packaging bag can be produced without bonding a sealant film to the resin substrate or providing a sealant layer on the resin substrate.

As described above, the coating layer is made of a non-metallic material. Using a non-metallic material for the coating layer is advantageous in that the used packaging bag can be easily disposed of by incineration. Specific examples of the non-metallic materials for the coating layer include water-soluble polymers, at least one of silane coupling agents and hydrolysates thereof, at least one of metal alkoxide and hydrolysates thereof, and inorganic layered compound. The coating layer containing these components is advantageous that it has high oxygen barrier properties and good adhesiveness to the underlayer containing a predetermined component. For example, when the underlayer containing an organic polymer as a main component is disposed between the resin substrate and the coating layer, good adhesiveness can be maintained even if the composition of the underlayer varies. Accordingly, the above laminate film can reduce variation in lamination strength due to variation in the composition of the underlayer. The term "main component" as used herein refers to a component that accounts for not less than 50 parts by mass to the total 100 parts by mass of the component that constitutes the layer. Examples of the organic polymer that constitutes the main component of the underlayer includes polyols, organic silane compounds, aqueous polyurethane resins and reaction products of polyols and organic silane compounds.

The coating layer may have transparency to visible light. The term "have transparency to visible light" as used herein (hereinafter, also simply referred to as "transparent") means that the total light transmittance (refer to JIS K7375: 2008) is not less than 60%. Whether the coating layer is transparent or not (whether the total light transmittance is not less than 60% or not) can be determined, for example, by forming a layer having the same composition and thickness as those of the coating layer on a film or a glass plate, and then measuring the total light transmittance of the laminate.

A laminate film for packaging according to a first aspect of the present disclosure includes: a resin substrate having a heat sealing surface that constitutes one outermost surface of the laminate film; a coating layer made of a non-metallic material; and an underlayer disposed between the resin substrate and the coating layer. The resin substrate includes a first layer that is made of olefin copolymer and constitutes the heat sealing surface, and a second layer made of biaxially stretched polypropylene, and the first and second layers are laminated to be in direct contact with each other.

The resin substrate included in the laminate film includes a first layer that is made of olefin copolymer and constitutes the heat sealing surface, and a second layer made of polypropylene, and the first and second layers are laminated and biaxially stretched. For example, depending on the form of the packaging bag, it may be opened by peeling off a heat sealed portion (seal portion) of the packaging bag. According to this laminate film, the strength and thickness of the first layer can be adjusted to produce a packaging bag that can be easily opened by hand. If the laminate film is desired to have light shielding characteristics, an ink layer may be further provided outside the coating layer, or a white polypropylene may be adopted as a resin that constitutes the second layer of the resin substrate. When a white polypropylene layer is adopted as the second layer of the resin substrate and a transparent coating layer is further adopted, there is an advantage that the ink layer provided outside the coating layer tends to have vivid coloration and a packaging bag having a good appearance can be easily produced. In addition, the entire laminate film may be transparent.

A laminate film for packaging according to a second aspect of the present disclosure includes: a resin substrate having a heat sealing surface that constitutes one outermost surface of the laminate film, and having a tear strength by the Elmendorf method in a range of 10 to 100 mN; a coating layer made of a non-metallic material; and a substrate having a tear strength by the Elmendorf method in a range of 10 to 100 mN, wherein the resin substrate, the coating layer, and the substrate are laminated in this order, and a tear strength by the Elmendorf method is in a range of 20 to 200 mN.

The resin substrate and the substrate, which mainly control the tear properties of the laminate film, each have a predetermined tear strength. Accordingly, the tear strength of the laminate film is sufficiently small (the tear strength by the Elmendorf method is 20 to 200 mN). For this reason, a packaging bag produced by using the laminate film can be easily opened by hand. Further, the "tear strength" described herein refers to a value measured by the Elmendorf method in compliance with JIS K-7128 unless otherwise specified.

For the resin substrate of the laminate film according to the second aspect, a film can be used in which a first layer that is made of copolymer and constitutes the heat sealing surface, and a second layer made of biaxially stretched polypropylene (OPP), and the first and second layers are laminated to be in direct contact with each other. The requirements to be satisfied by the first and second layers may be set depending on the contents to be packed in the packaging bag and the feeling of use of the packaging bag, and the physical properties of the copolymer and polypropylene (OPP) may be determined on the basis of these requirements. For example, depending on the form of the packaging bag, it may be opened by peeling off a heat sealed portion (seal portion) instead of tearing the laminate film. In such a case, the strength and thickness of the first layer can be adjusted to set the seal strength to be in the range of 0.5 to 20.0 N/15 mm. The material for the substrate is not limited as far as the tear strength is in the range of 10 to 100 mN as described above, and may be a biaxially stretched polypropylene film (OPP film), paper, or the like.

Another aspect of the present disclosure provides a packaging bag formed by bonding films, wherein the film includes the above laminate film. This packaging bag can be easily opened by hand, and has gas barrier properties.

Advantageous Effect of Invention

The present invention provides a laminate film useful for efficiently producing packaging bags that can be easily opened by hand and have gas barrier properties, and a packaging bag produced by using the same.

DESCRIPTION OF REPRESENTATIVE EMBODIMENTS

Figure 1:
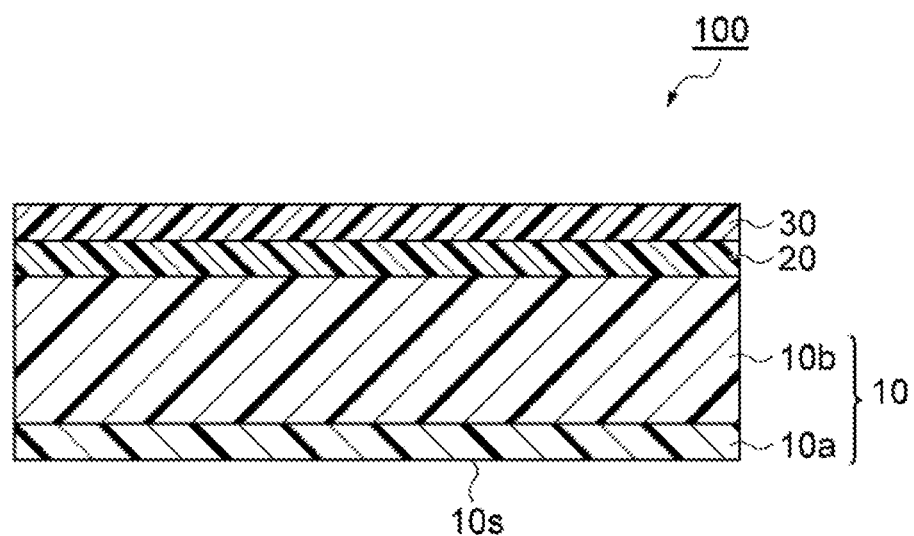
FIG. 1 is a schematic cross-sectional view of a laminate film according to a first embodiment.

With reference to the drawings, embodiments of the present invention will be described. In the drawings, the same or similar elements are denoted by the same reference characters, and duplicated description thereof is omitted. It is to be understood that the present invention is not necessarily limited to the following embodiments and that the following embodiments are representative of the present invention.

First Embodiment

FIG. 1 is a schematic cross-sectional view of a laminate film according to a first embodiment. A laminate film 100 includes a film-shaped resin substrate 10, and an underlayer 20 and a coating layer 30 laminated in this order on one surface of the resin substrate 10. The entire laminate film 100 may be transparent.

The resin substrate 10 has a heat sealing surface 10s which constitutes one outermost surface (lower surface in FIG. 1) of the laminate film 100. That is, the resin substrate 10 itself has heat sealing characteristics. Accordingly, a packaging bag can be produced without bonding a sealant film to the resin substrate 10 or providing a sealant layer on the resin substrate 10. As shown in FIG. 1, the resin substrate 10 includes a first layer 10a that constitutes the heat sealing surface 10s and a second layer 10b made of biaxially stretched polypropylene, and is formed as a multilayer structure in which the first layer 10a and the second layer 10b are laminated to be directly in contact with each other.

A tear strength of the resin substrate 10 by the Elmendorf method is preferably in the range of 10 to 100 mN, and more preferably in the range of 20 to 60 mN. When the tear strength of the resin substrate 10 is 10 mN or more, the laminate film 100 can be prevented from being unintentionally torn. On the other hand, when the tear strength is 100 mN or less, the packaging bag produced by using the laminate film 100 has good tear propagation and can be smoothly and easily opened. The "tear strength" in the present invention refers to a value measured by the Elmendorf method in compliance with JIS K-7128 unless otherwise specified.

The first layer 10a is provided for imparting heat seal characteristics to the resin substrate 10. The melting point of the resin that constitutes the first layer 10a may be, for example, in the range of 60 to 140° C., or alternatively, in the range of 80 to 120° C. The melting point (melting temperature) of the resin can be obtained by measuring the temperature under the conditions of 30° C. to 180° C. with temperature rising rate of 10° C./min by using a differential scanning calorimetry in compliance with the method specified in JIS K7121:2012. The thickness of the first layer 10a is preferably in the range of 0.5 to 5 μm. The thickness of the first layer 10a can be adjusted to optimize a heat seal strength of the first layer 10a. When the thickness of the first layer 10a is 0.5 μm or more, heat sealing effects can be readily obtained. On the other hand, when the thickness of the first layer 10a is 5 μm or less, the effect on the mechanical properties of the resin substrate 10 can be sufficiently reduced.

The resin material that constitutes the first layer 10a is preferably an olefin-based copolymer, and specifically a propylene copolymer in view of adhesiveness to the second layer made of polypropylene. That is, the resin material may be a random copolymer in which olefin such as propylene as a main monomer and a smaller amount of comonomer, which is different from the main monomer, are randomly copolymerized to form a homogeneous layer, or a block copolymer in which olefin such as propylene as a main monomer and the above comonomer are present as a block copolymer or rubbery polymer to form a heterogeneous layer. Specific examples of these copolymers include (propylene-1-butene)-(propylene-1-butene) copolymer, (propylene-1-butene)-(propylene-ethylene-1-butene) copolymer, (propylene-ethylene-1-butene)-(propylene-1-butene) copolymer, (propylene-ethylene-1-butene)-(propylene-ethylene-1-butene) copolymer, and (propylene-1-hexene)-(propylene-1-hexene) copolymer, and is preferably (propylene-1-butene)-(propylene-1-butene) copolymer, or (propylene-1-hexene)-(propyl ene-1-hexene) copolymer. When olefin-based copolymer other than propylene copolymer is used as the first layer 10a, a layer made of propylene copolymer may be provided as an intermediate layer to improve adhesiveness between the first layer 10a and the second layer 10b.

The second layer 10b is made of polypropylene. The tear strength of the second layer 10b by the Elmendorf method is preferably in the range of 10 to 100 mN, and more preferably in the range of 20 to 60 mN. When the second layer 10b is formed of a biaxially stretched film, the tear strength in a vertical direction (MD) and a lateral direction (TD) is preferably within the above range. The thickness of the second layer 10b is not specifically limited, and for example in the range of 2 to 200 μm, or may be in the range of 10 to 100 μm, or alternatively, in the range of 15 to 50 μm. This thickness can be adjusted depending on the applications or required characteristics.

The resin substrate 10 can be obtained by laminating the first layer 10a and the second layer 10b by a known resin lamination method such as extrusion lamination, co-extrusion, and inflation, and then stretching the layers in the vertical direction (MD) and the lateral direction (TD) concurrently or subsequently.

In addition, as far as the resin substrate 10 has the heat sealing surface 10s that constitutes one of the outermost surfaces of the laminate film 100 and the tear strength within the above range, the resin substrate 10 can be configured by combining two or more types of the above resin films or by laminating a plurality of layers of the same type. Moreover, a third layer (not shown) having heat seal characteristics may be further provided between the second layer 10b and the underlayer 20. The resin constituting the third layer may be the same resin that constitutes the first layer. The third layer may have thickness in the range of 0.5 to 5 μm as with the first layer 10a.

The thickness of the resin substrate 10 is not specifically limited, and for example may be in the range of 3 to 200 or may be in the range of 10 to 100 or alternatively, in the range of 15 to 50 μm. This thickness can be adjusted depending on the applications or required characteristics. In order to provide a packaging bag that can be opened by pulling apart the periphery of the seal portion of the packaging bag by hands, the strength of the seal portion (seal strength) may be in the range of 0.5 to 4.0 N/15 mm. The seal strength can be measured under the conditions of press pressure of 0.2 MPa and press time of 1 second by using a thermal gradient testing machine.

The resin substrate 10 may contain at least one additive selected from a filler, antistatic agent, plasticizer, lubricant, antioxidant and the like. The surface of the resin substrate 10 may be processed with at least one treatment selected from chemical treatment, solvent treatment, corona treatment, plasma treatment, and ozone treatment.

The underlayer 20 is provided between the resin substrate 10 and the coating layer 30. The underlayer 20 can improve the adhesiveness between the resin substrate 10 and the coating layer 30 and enhance the lamination strength of the laminate film 100. The underlayer 20 is a layer that contains an organic polymer as a main component, and may also be called a primer layer.

The organic polymer content of the underlayer 20 may be 70 mass % or more, or alternatively, may be 80 mass % or more. Examples of organic polymer include polyols having two or more hydroxyl groups at the polymer terminal, organic silane compounds such as a silane coupling agent or hydrolysate thereof, reaction products (aqueous polyurethane resin) obtained by two-liquid reaction of the above polyols and the isocyanate compounds, and reaction products of the polyols and the silane coupling agents. These can be used singly or in combination of two or more.

Examples of polyols include at least one selected from acrylic polyol, polyvinyl acetal, polystyle polyol, polyurethane polyol, and the like. Acrylic polyol may be obtained by polymerizing acrylic acid derivative monomer or by copolymerizing acrylic acid derivative monomer and other monomers. Examples of acrylic acid derivative monomer include ethyl methacrylate, hydroxyethyl methacrylate, hydroxypropyl methacrylate, and hydroxybutyl methacrylate. Examples of monomer copolymerized with acrylic acid derivative monomer include styrene and the like.

Examples of silane coupling agent include vinyl trimethoxy silane, γ-chloropropyl methyl dimethoxy silane, γ-chloropropyl trimethoxy silane, glycidoxy propyl trimethoxy silane, γ-methacryloxy propyl trimethoxy silane, and γ-methacryloxy propyl methyldimethoxy silane. Organic silane compound may be hydrolysate of these silane coupling agents. Organic silane compound may contain one of the above silane coupling agents and hydrolysate thereof or a combination of two or more. When the underlayer 20 contains silane coupling agent or hydrolysate thereof, they may be the same as that contained in the coating layer 30 or may be different from that contained in the coating layer 30.

Isocyanate compound serves to increase adhesiveness between the resin substrate 10 and the coating layer 30 by urethane bond generated by reaction with polyol. That is, isocyanate compound functions as a crosslinking agent or hardener. Examples of isocyanate compound include monomers of aromatic tolylene diisocyanate (TDI), diphenylmethane diisocyanate (MDI), aliphatic xylene diisocyanate (XDI), hexamethylene diisocyanate (HMDI), isophorone diisocyanate (IPDI), and the like, polymers thereof, and derivatives thereof. These isocyanate compounds can be used singly or in combination of two or more.

The underlayer 20 may contain at least one selected from polyethylene imine and derivative thereof, polyolefin emulsion, polyimide, melamine, phenol, and inorganic silica such as organic modified colloidal silica. The thickness of the underlayer 20 is not specifically limited, and for example in the range of 0.005 to 5 μm, or alternatively may be in the range of 0.01 to 1 μm. The thickness can be adjusted depending on the applications or required characteristics.

The underlayer 20 can be formed by preparing liquid mixture by mixing the above components in an organic solvent in a given ratio, and applying the prepared liquid mixture on one surface of the resin substrate 10. The liquid mixture may contain, for example, hardening accelerators such as tertiary amines, imidazole derivatives, metal salt compounds of carboxylic acid, quaternary ammonium salt, quaternary phosphonium salts; antioxidants such as phenols, sulphurs, phosphites; leveling agents; fluidity modifiers; catalysts; crosslinking accelerators; and fillers.

The liquid mixture can be applied on the resin substrate 10 by a known printing method such as offset printing, gravure printing, and silk screen printing, or a known coating method such as roll coating, knife edge coating, and gravure coating. After coating, the liquid mixture can be heated to, for example, 50 to 200° C., and dried and/or cured to form the underlayer 20.

The coating layer 30 is made of a non-metallic material. Using a non-metallic material for the coating layer 30 is advantageous in that the used packaging bag can be easily disposed of by incineration. Specific examples of the non-metallic material for the coating layer include a water-soluble polymer, at least one of silane coupling agent and a hydrolysate thereof, at least one of metal alkoxide and a hydrolysate thereof, and an inorganic layered compound. The coating layer 30 has good oxygen barrier properties, since it contains inorganic layered compounds.

The water-soluble polymer is not specifically limited, and may be, for example, polyvinyl alcohol polymer, alcohol polymer such as starch, methylcellulose, and carboxyl methylcellulose, or acryl polyol polymer. In view of improvement in oxygen gas barrier properties, the water-soluble polymer preferably contains polyvinyl alcohol polymer. The number-average molecular weight of the water-soluble polymer is, for example, in the range of 40,000 to 180,000. When the underlayer 20 contains polyols, the polyols may be the same or different from the water-soluble polymer contained in the coating layer 30.

The polyvinyl alcohol water-soluble polymer can be obtained by, for example, saponification (including partial saponification) of polyvinyl acetate. In this water-soluble polymer, acetic acid group may remain by a few tens of percent, or acetic acid group may remain by a few percent.

The water-soluble polymer content in the coating layer 30 is in the range of, for example, 15 to 50 mass %. The lower limit of the water-soluble polymer content in the coating layer 30 may be 20 mass % in order to further lower the oxygen permeability. The upper limit of the water-soluble polymer content in the coating layer 30 may be 45 mass % in order to further lower the oxygen permeability.

Examples of metal alkoxide contained in the coating layer 30 include those expressed by a general formula $M(OR)_n$ such as tetraethoxysilane $[Si(OC_2H_5)_4]$ and triisopropoxy aluminum $[Al(OC_3H_7)_3]$ and hydrolysates thereof. The metal alkoxide can be used singly or in combination of two or more.

The total content of the metal alkoxide and hydrolysates thereof in the coating layer 30 is, for example, in the range of 40 to 70 mass %. The lower limit of the total content of the metal alkoxide and hydrolysates thereof in the coating layer 30 may be 50 mass % in order to further lower the oxygen permeability. The upper limit of the total content of the metal alkoxide and hydrolysates thereof in the coating layer 30 may be 65 mass % in order to further lower the oxygen permeability.

The silane coupling agent contained in the coating layer 30 includes silane coupling agents having an organic functional group. Examples of such a silane coupling agent include ethyltrimethoxy silane, vinyl trimethoxy silane, γ-chloropropyl methyl dimethoxy silane, γ-chloropropyl trimethoxy silane, glycidoxy propyl trimethoxy silane, γ-methacryloxy propyl trimethoxy silane, and γ-methacryloxy propyl methyldimethoxy silane and hydrolysates thereof. These can be used singly or in combination of two or more.

Preferably, at least one of silane coupling agent and hydrolysates thereof contains epoxy group as an organic functional group. Examples of the silane coupling agent containing an epoxy group include γ-glycidoxypropyltrimethoxysilane, and β-(3,4-epoxycyclohexyl) ethyltrimethoxysilane. Silane coupling agents having epoxy groups and hydrolysates thereof may also contain organic functional groups other than the epoxy group, such as vinyl groups, amino groups, methacrylic groups or ureyl groups.

The silane coupling agent having an organic functional group and hydrolysates thereof can further improve oxygen barrier properties and adhesiveness to the underlayer 20 of the coating layer 30 by interaction between the organic functional group and the hydroxyl group of the water-soluble polymer. Specifically, an epoxy group of the silane coupling agent and hydrolysates thereof and a hydroxyl group of the polyvinyl alcohol can form the coating layer 30 having particularly high oxygen barrier properties and adhesiveness to the underlayer 20 by the interaction.

The total content of the silane coupling agent and hydrolysates thereof in the coating layer 30 is, for example, in the range of 1 to 15 mass %. The lower limit of the total content of the silane coupling agent and hydrolysates thereof in the coating layer 30 may be 2 mass % in order to further increase the lamination strength and lower the oxygen permeability. The upper limit of the total content of the silane coupling agent and hydrolysates thereof in the coating layer 30 may be 12 mass %.

The inorganic layered compound contained in the coating layer 30 is a crystalline inorganic compound having a layered structure. Examples of the inorganic layered compound include clay minerals such as kaolinite, smectite, and mica. The coating layer 30 may contain one of these or a combination of two or more. A particle diameter of the organic layered compound is, for example, in the range of 0.1 to 10 μm. An aspect ratio of the inorganic layered compound is, for example, in the range of 50 to 5,000 μm.

Of the inorganic layered compounds, clay minerals of the smectite group are preferred since the water-soluble polymer or metal alkoxide enters between layers of the layered structure to thereby expand the interlayer space of the composite coating. Specific examples of clay minerals of the smectite group include montmorillonite, hectorite, and saponite. Among these, in view of stability and coating properties of the liquid mixture, montmorillonite is more preferred.

The content of the inorganic layered compound in the coating layer 30 is, for example, in the range of 2 to 10 mass % in view of achieving high oxygen barrier properties and high lamination strength. The lower limit of the content of the inorganic layered compound in the cover layer 30 may be 2.5 mass % in order to further lower the oxygen permeability. The upper limit of the content of the inorganic layered compound in the cover layer 30 may be 8 mass % or may be 5 mass % in order to further increase the lamination strength.

The thickness of the coating layer 30 is not specifically limited, and for example in the range of 0.01 to 50 μm, or may be in the range of 0.05 to 5 μm, or alternatively, in the range of 0.1 to 1 μm. The thickness can be adjusted depending on the applications or required characteristics. The coating layer 30 containing the above components can reduce variation in lamination strength of the laminate film 100 regardless of composition change of the underlayer 20. Accordingly, the degree of freedom in material selection of the underlayer 20 can be increased and the specification of the laminate film can be easily selected. Further, since the lamination strength of the laminate film 100 can be stably increased, it can be advantageously used for the packaging bag which requires high sealing properties even if it does not have a vapor deposition layer made of metal oxide. For these reasons, it is preferable that the underlayer 20 is in direct contact with the coating layer 30.

The coating layer 30 can be formed by preparing the above components in an organic solvent in a given ratio, and applying the prepared liquid mixture on the surface of the underlayer 20, and drying and curing the applied liquid. The liquid mixture may contain other components within the range that does not impair the physical properties of the coating layer 30. Examples of such components include dispersion agent, stabilizer, viscosity modifier, and coloring agent.

The liquid mixture can be applied on the underlayer 20 by a known printing method such as offset printing, gravure printing, and silk screen printing, or a known coating method such as roll coating, knife edge coating, and gravure coating. After coating, the liquid mixture can be heated to, for example, approximately 100° C., and dried and/or cured to form the coating layer 30.

The tear strength of the laminate film 100 by the Elmendorf method is preferably in the range of 10 to 200 mN. When the tear strength of the laminate film 100 is 10 mN or more, the laminate film 100 can be prevented from being unintentionally torn. On the other hand, when the tear strength is 200 mN or less, the packaging bag produced by using the laminate film 100 can be easily opened by hand. The tear strength of the laminate film 100 in the vertical direction (MD) and the lateral direction (TD) of the film that forms the laminate film 100 is preferably within the above range.

The laminate film 100 has good oxygen barrier properties. That is, even if it does not have a vapor deposition layer made of inorganic oxide, good oxygen barrier properties can be obtained. Accordingly, the laminate film 100 can be produced with a lower production cost than that having a vapor deposition layer made of inorganic oxide. Such a laminate film 100 is especially useful for the application that does not require such high water vapor barrier properties. For example, it can be advantageously used as a laminate film of a packaging bag that stores contents with moisture.

The oxygen barrier properties of the laminate film 100 can be evaluated by oxygen permeability measured by the mocon method (isopiestic method) in compliance with JIS K7126-2: 2006. The oxygen permeability according to this evaluation method may be, for example, 3 ml/m$^2$/day or less, or may be 2.5 ml/m$^2$/day or less. Further, the oxygen permeability herein is a value measured under the conditions of atmospheric pressure, 30° C. and 70% RH.

The lamination strength of the laminate film 100 can be measured by T-peel method (crosshead speed: 300 mm/min.) by using a Tensilon tensile tester in compliance with JIS Z 0238:1998. The lamination strength of the laminate film 100 is preferably in the range of 1.0 to 4.0 N/15 mm, and more preferably in the range of 2.0 to 4.0 N/15 mm.

Figure 2:
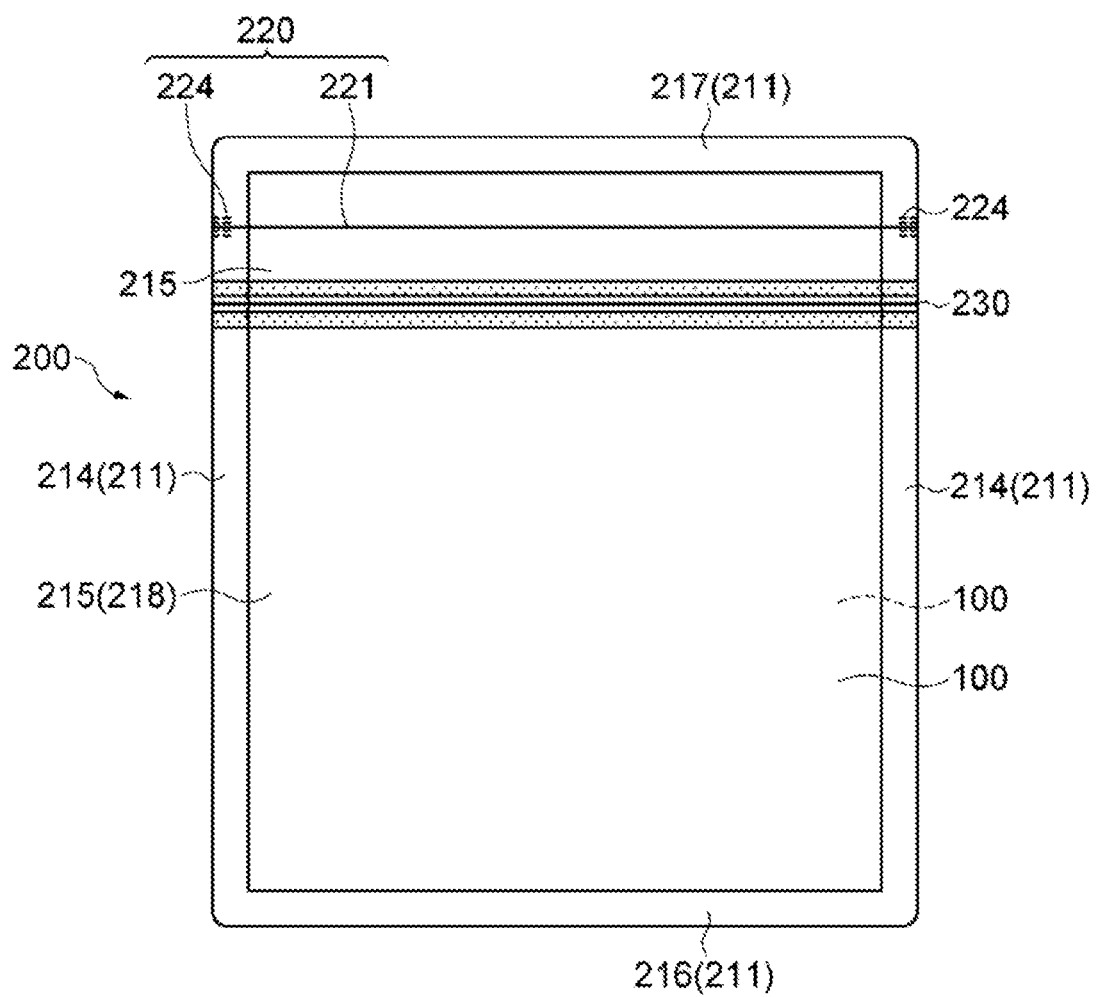
FIG. 2 is a schematic cross-sectional view of an embodiment of a packaging bag.

FIG. 2 is a plan view of an embodiment of the packaging bag formed by using the laminate film. A packaging bag 200 includes a seal portion 211 formed by bonding peripheries of a pair of laminate films 100, 100 together having a substantially rectangular shape, and an accommodating portion 218 formed between the pair of laminate films 100, 100 by the seal portion 211. That is, the packaging bag 200 is sealed by the seal portion 211 at side ends 214, a lower end 216, and an upper end 217. The packaging bag 200 includes the accommodating portion 218 that accommodates the contents such as food products in a non-sealed portion (sheet portion) 215 surrounded by the seal portion 211. A product to be packed such as a food product is sealed in the accommodating portion 218. Further, the seal portion 211 at the lower end 216 may be sealed after the product to be packed is inserted in the accommodating portion 218.

A pair of laminate films 100, 100 are overlapped such that the resin substrates 10, 10 face each other. Since the second layer 10b of the laminate film 100 has heat sealing properties, the seal portion 211 can be formed without bonding a sealant film to the resin substrates 10, 10 or providing a sealant layer on the resin substrates 10, 10.

Since the laminate films 100, 100 have high oxygen gas barrier properties, the contents packed in the accommodating portion 218 can be sufficiently prevented from being degraded by oxygen. The packaging bag 200 may have a laminate film 101 or a laminate film 102 instead of the laminate film 100. In this case as well, the contents packed in the accommodating portion 218 can be sufficiently prevented from being degraded by oxygen. Another layer may also be disposed on the resin substrate 10 and the coating layer 30 of the laminate film 100.

A procedure of producing the packaging bag 200 by using the laminate film 100 will be described below. A pair of laminate films 100, 100 is prepared. The resin substrates 10, 10 of the laminate films 100, 100 are disposed to face each other, and the second layers 10b, 10b of the resin substrates 10, 10 are then adhered to each other with a re-sealing means 230 such as a fastener tape being interposed therebetween. Thus, the seal portions 211 are formed at positions corresponding to the upper end 217 and the side ends 214, 214 to form a non-seal portion 215 which is surrounded by the seal portions 211 on the three sides.

After the seal portion 211 is formed, an opening means 220 may be formed. For example, easy-opening processing sections 224, 224 formed by score lines are formed on the side ends 214, 214. The easy-opening processing section 224 is not limited to score lines, but may also be a notch of V-shape, U-shape, I-shape, or the like. Providing score lines or notch in the seal portion has an advantage that the packaging bag can be easily opened from that position by hand. A half-cut line 221 may be formed on the surface of the laminate film 100 between the upper end 217 and the re-sealing means 230 to provide an opening trajectory from the easy-opening processing section 224. The half-cut line 221 can be formed by using a laser. After the opening means 220 is formed, the seal portion 211 is cut off and trimmed to form the individual packaging bags.

Then, a product to be packed is inserted from the lower end 216 which is unsealed. Subsequently, the laminate films 100 are adhered to each other at the lower end 216 to thereby form the seal portion 211 on the lower end 216. Thus, the packaging bag 200 can be produced. The half-cut line may be formed before the pair of laminate films 100, 100 have a slit of a predetermined width.

The packaging bag 200 includes the opening means 220 that traverses the side ends 214, 214 of the packaging bag 200 and between the side ends 214, 214 on the upper end to the non-seal portion 215 to cut open the packaging bag 200, and the re-sealing means 230 on the lower side to the opening means 220 to re-seal the accommodating portion 218 after it is opened by the opening means 220. The re-sealing means 230 can appropriately adopt a re-sealable structure known in the art. For example, it may be a fastener made of a synthesized resin that is re-sealable by a strip-shaped projection and a strip-shaped groove fitting each other, or an adhesive seal.

Figure 3:
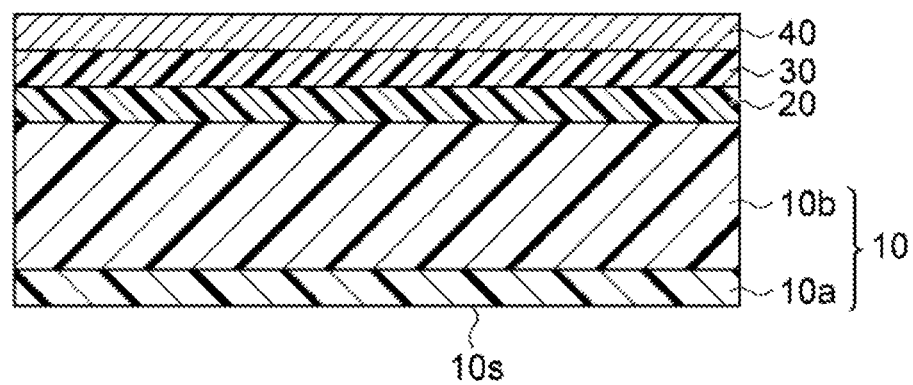
FIG. 3 is a schematic cross-sectional view of a modified example of the laminate film according to the first embodiment.

A modified example of the first embodiment will be described. The laminate film 100 may include another layer or film between the resin substrate 10 and the underlayer 20 without significantly impairing the function of the laminate film 100. Further, the laminate film may include an ink layer 40 and/or another substrate directly laminated on the coating layer 30 (see FIG. 3).

Figure 4:
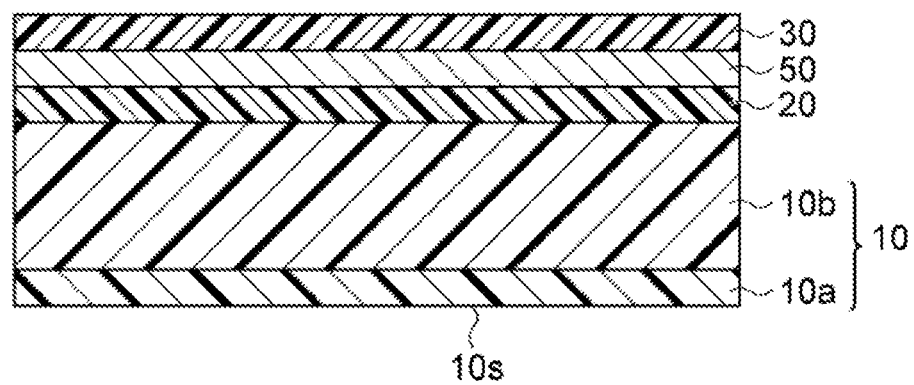
FIG. 4 is a schematic cross-sectional view of a modified example of the laminate film according to the first embodiment.

The laminate film 100 may further include a vapor deposition layer. For example, as shown in FIG. 4, a vapor deposition layer 50 is interposed between the underlayer 20 and the coating layer 30. In this case, the underlayer 20 contributes to improvement in adhesiveness of the vapor deposition layer 50 to the resin substrate 10. The vapor deposition layer 50 is made of an inorganic compound such as aluminum oxide, silicon oxide, tin oxide, magnesium oxide, zinc oxide, and a mixture thereof, or the like, and has transparency and gas barrier properties to oxygen, water vapor or the like.

The thickness of the vapor deposition layer 50 may be appropriately determined depending on the type or configuration of the inorganic compound, and may be, for example, in the range of 5 to 300 nm. When the thickness of the vapor deposition layer 50 is 5 nm or more, a homogeneous vapor deposition layer is likely to be formed and the vapor deposition layer sufficiently performs a function as a gas barrier material. On the other hand, when the thickness of the vapor deposition layer 50 is 300 nm or less, the vapor deposition layer 50 has a sufficient flexibility, and occurrence of cracks on the vapor deposition layer 50 can be sufficiently prevented even if external factors such as bending and tensioning is applied to the laminate after the vapor deposition layer 50 is formed. For the above reason and the productivity, the thickness of the vapor deposition layer 50 is preferably in the range of 10 to 200 nm.

The vapor deposition layer 50 can be formed on the underlayer 20 in various ways, and for example, may be formed by an ordinary vacuum vapor deposition method. Alternatively, other thin film forming processes such as sputtering, ion plating and plasma enhanced chemical vapor deposition (CVD) may be used.

The shape of the packaging bag 200 is not limited to a four-sided bag, and may be a three-side seal bag or a standing pouch with a bottom tape attached. Since the packaging bag produced by using the laminate film 100 can be easily opened by a user, it is advantageous for products that require easy opening. Further, since the packaging bag has gas barrier properties provided by the coating layer or the vapor deposition layer, it is useful to wrap products that require prevention of degradation due to oxygen or water vapor to an appropriate extent (candies, chocolate, food products such as dried foods, stationary with a volatile component such as ink). Examples of the packaging bag for these products include a butt-seam bag and a gazette bag.

Second Embodiment

Figure 5:
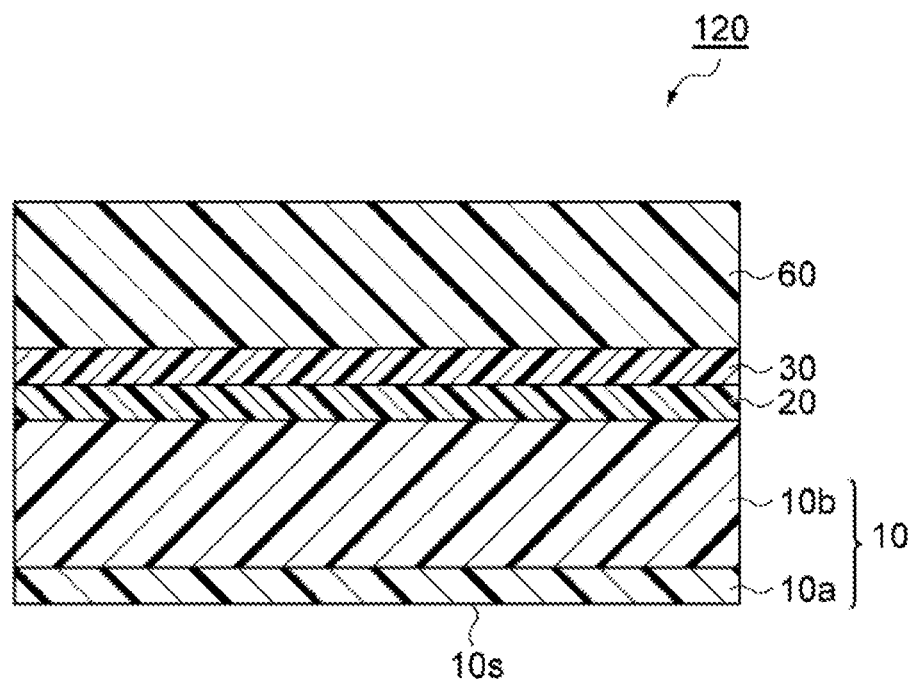
FIG. 5 is a schematic cross-sectional view of the laminate film according to a second embodiment.

FIG. 5 is a schematic cross-sectional view of a laminate film of a second embodiment. A laminate film 120 includes the film-shaped resin substrate 10, and the underlayer 20, a cover layer 30 and a substrate 60 laminated in this order on one surface of the resin substrate 10. The laminate film 120 is different from the laminate film 100 of the first embodiment in having the substrate 60. The difference will be described below.

The substrate 60 is a layer that constitutes an outermost layer (an upper surface in FIG. 5) of the packaging bag. The tear strength of the substrate 60 by the Elmendorf method is preferably in the range of 10 to 100 mN, and preferably in the range of 20 to 60 mN. When the tear strength of the substrate 60 is 10 mN or more, the laminate film 120 can be prevented from being unintentionally torn. On the other hand, when the tear strength is 100 mN or less, the packaging bag produced by using the laminate film 120 can be easily opened by hand. The material for the substrate 60 is not limited as far as the tear strength is within the above range. Examples of the material that constitutes the substrate 60 may be the same resin material as that of the second layer 10b of the resin substrate 10. The substrate 60 is not limited to a resin material, and may be paper, for example.

The laminate film 120 may be formed by bonding a surface forming the coating layer 30 of the laminate composed of the resin substrate 10, the underlayer 20, and the coating layer 30 and the substrate 60 with an adhesive interposed therebetween. Bonding can be performed by using a known dry lamination method, non-sol lamination method or the like. The adhesive can be selected from various adhesives as appropriate depending on the lamination methods. For example, known adhesives such as polyurethane adhesives, polyester adhesives, polyether adhesives, epoxy adhesive adhesives, polyethylene imine adhesives and polybutadiene adhesives can be used. Further, the substrate 60 can be directly bonded to the laminate (resin substrate 10, underlayer 20 and coating layer 30) as with an extrusion lamination method.

The tear strength of the laminate film 120 by the Elmendorf method is in the range of 20 to 200 mN. When the tear strength of the laminate film 120 is 20 mN or more, the laminate film 120 can be prevented from being unintentionally torn. On the other hand, when the tear strength is 200 mN or less, the packaging bag produced by using the laminate film 120 can be easily opened by hand. The tear strength in the vertical direction (MD) and the lateral direction (TD) is preferably within the above range.

Figure 6:
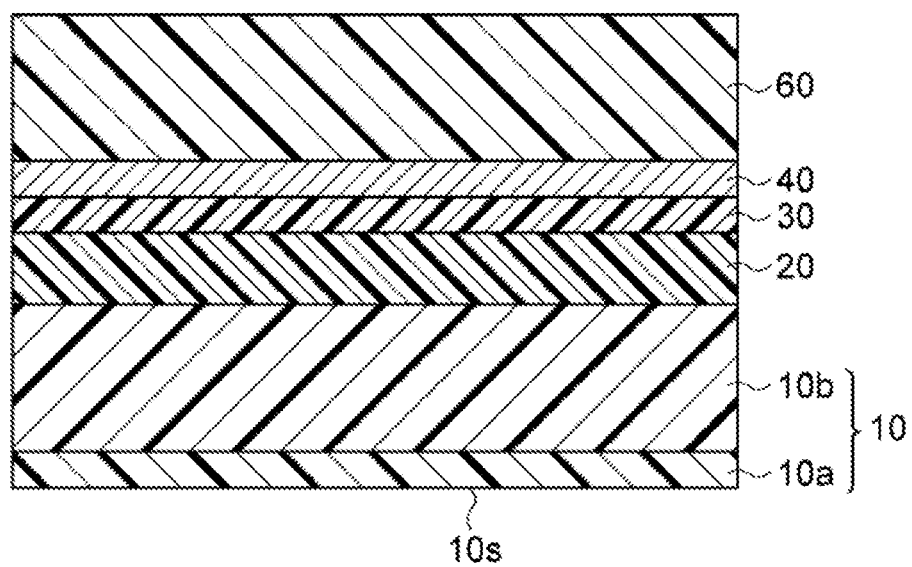
FIG. 6 is a schematic cross-sectional view of a modified example of the laminate film according to the second embodiment.

Since printing is generally performed on a laminate film used as a wrapping material, an ink layer such as a print layer or a light-shielding layer may be provided on the laminate film 120. If light-shielding properties are desired to be imparted, the ink layer 40 may be provided between the coating layer 30 and the substrate 60 as shown in FIG. 6. Instead of providing the ink layer 40 between the coating layer 30 and the substrate 60, an ink layer or a print layer may be provided outside the substrate 60, or white polypropylene may be used as a resin that constitutes the second layer 10b of the resin substrate 10. When a white polypropylene layer is adopted as the second layer 10b and a transparent coating layer 30 and underlayer 20 are further adopted, there is an advantage that an ink layer (or a print layer) provided outside the coating layer 30 tends to have vivid coloration and a packaging bag having a good appearance can be easily produced. Alternatively, when a print layer is provided outside the coating layer 30 and inside the substrate 60, or at a bonding surface of the transparent substrate 60 to the coating layer 30, there is an advantage that the print layer is not exposed when the packaging bag is used, and thus the print layer is not damaged.

The laminate film 120 has good oxygen barrier properties. That is, even if it does not have a vapor deposition layer made of inorganic oxide, good oxygen barrier properties can be obtained. Accordingly, the laminate film 120 can be produced with a lower production cost than that having a vapor deposition layer made of inorganic oxide. Such a laminate film 120 is especially useful for the application that does not require such high water vapor barrier properties. For example, it can be advantageously used as a laminate film of a packaging bag that stores contents with moisture.

Figure 7:
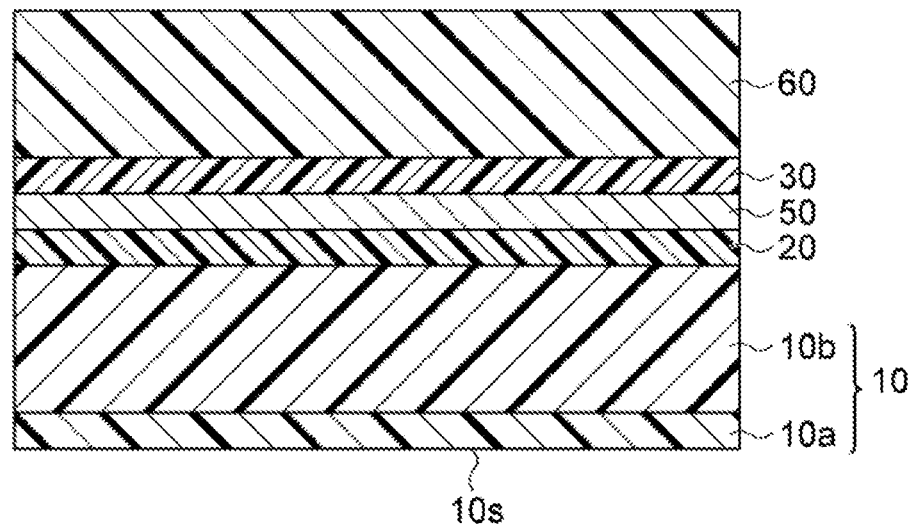
FIG. 7 is a schematic cross-sectional view of a modified example of the laminate film according to the second embodiment.

Although the laminate film 120 which does not include a vapor deposition layer has been described as an example, the laminate film 120 may further include a vapor deposition layer. For example, as shown in FIG. 7, the vapor deposition layer 50 may be interposed between the underlayer 20 and the coating layer 30 as with the first embodiment.

The shape of the packaging bag produced by using the laminate film 120 may be the same as that illustrated in FIG. 2, or may be a three-side seal bag or a standing pouch with a bottom tape attached. Since the packaging bag produced by using the laminate film 120 can be easily opened by a user, it is advantageous for products that require easy opening. Further, since the packaging bag has gas barrier properties provided by the coating layer or the vapor deposition layer, it is useful to wrap products that require prevention of degradation due to oxygen or water vapor to an appropriate extent (candies, chocolate, food products such as dried foods, stationary with a volatile component such as ink). Examples of packaging bags for these products include butt-seam bags and gazette bags.

EXAMPLES

The present invention will be further described in detail with reference to Examples and Comparative Examples. However, as stated, the present invention is not limited to the Examples described below.

<Evaluation of Coating Layer>

Reference Example 1

As a liquid mixture for forming an underlayer, a liquid mixture A (solid content: 2 mass %) was prepared by mixing γ-isocyanate propyl trimethyl silane, acryl polyol, and aliphatic xylene diisocyanate with a diluting solvent (ethyl acetate) at a mass ratio of 11:53:37. The liquid mixture A was coated by gravure coating on one surface of a biaxially stretched polypropylene film (thickness: 20 μm), which was provided as a resin substrate. After coating, the liquid mixture A was dried to thereby form an underlayer on one surface of the biaxially stretched polypropylene film. For the biaxially stretched polypropylene film, a commercially available product (manufactured by AJ Plast Public Co., Ltd, Trade name PJ201, thickness: 20 μm) composed of a homopolymers type polypropylene film and a copolymer type polypropylene film was used.

A liquid mixture B was prepared by mixing four components of polyvinyl alcohol (PVA, the number-average molecular weight: 75,000), γ-glycidoxypropyltrimethoxy silane (GPTMS), tetra tetraethoxy silane (TEOS), and montmorillonite (Mon.) with water at a mass ratio shown in Table 1. The liquid mixture B was coated on the underlayer by gravure coating. After coating, the liquid mixture B was heated and dried to thereby form a coating layer on the underlayer. Thus, a laminate film of reference Example 1 was produced. The thickness of the underlayer of the laminate film was approximately in the range of 60 to 70 nm, and the thickness of the coating layer was approximately in the range of 0.4 to 0.6 μm.

For evaluation of adhesiveness between the coating layer and the substrate, an unstretched polypropylene film (thickness: 20 μm) was bonded to the coating layer of the laminate film via a two-liquid curing type urethane-based adhesive by dry lamination to thereby form an evaluation film. An oxygen permeability of the obtained evaluation film was measured by using an oxygen permeability measurement machine (manufactured by MOCON Inc., Trade name: OXTRAN 2/21). The measurement atmosphere was 30° C., 70% RH. The measurement results are shown in Table 1.

The lamination strength of the above evaluation film was measured. Specifically, the lamination strength of the unstretched polypropylene film and the laminate film was measured by T-peel method (crosshead speed: 300 mm/min.) by using a tensile tester (manufactured by A & D Co., Ltd., trade name: Tensilon universal material tester) in compliance with JIS Z 0238:1998. The measurement results are shown in Table 1.

Reference Examples 2 to 5, Comparative Example 1

The laminate film was produced in the same manner as Reference Example 1 except that the mass ratio of the polyvinyl alcohol, γ-glycidoxypropyltrimethoxy silane, tetra tetraethoxy silane, and montmorillonite in the liquid mixture B was changed as shown in Table 1. Then, evaluation of the laminate film was performed in the same manner as Reference Example 1. The results are shown in Table 1.

Reference Example 6

As the liquid mixture for forming an underlayer, aqueous polyurethane resin emulsion (manufactured by Mitsui Takeda Chemical Inc., trade name: WS5000) was prepared. The laminate film was formed in the same manner as Reference Example 3 except that the above was used instead of the liquid mixture A. Then, evaluation of the laminate film was performed in the same manner as Reference Example 3. The results are shown in Table 1.

Reference Example 7

As a resin substrate, a biaxially stretched polypropylene (manufactured by Mitsui Chemicals Tohcello Inc, trade name: U1, thickness: 20 μm) was prepared. The laminate film was formed in the same manner as Reference Example 6 except that the above was used for a resin substrate. Then, evaluation of the laminate film was performed in the same manner as Reference Example 6. The results are shown in Table 1.

Comparative Example 2

As the liquid mixture for forming an underlayer, aqueous polyurethane resin emulsion (manufactured by Mitsui Takeda Chemical Inc., trade name: WS5000) was prepared. The laminate film was formed in the same manner as Comparative Example 1 except that the above was used instead of the liquid mixture A. Then, evaluation of the laminate film was performed in the same manner as Comparative Example 1. The results are shown in Table 1.

Comparative Example 3

As a resin substrate, a biaxially stretched polypropylene (manufactured by Mitsui Chemicals Tohcello Inc, trade name: U1, thickness: 20 μm) was prepared. The laminate film was formed in the same manner as Comparative Example 2 except that the above was used. Then, evaluation of the laminate film was performed in the same manner as Comparative Example 2. The results are shown in Table 1.

TABLE 1

| No. | composition of cover layer (mass %) | | | | Oxygen permeability ($ml/m^2/day$) | Lamination strength (N/15 mm) |
|---|---|---|---|---|---|---|
| | PVA | GPTMS | TEOS | Mon. | | |
| Reference Example 1 | 35 | 1 | 61 | 3 | 3.69 | 2.10 |
| Reference Example 2 | 35 | 3 | 59 | 3 | 2.10 | 2.10 |
| Reference Example 3 | 35 | 5 | 57 | 3 | 1.49 | 2.00 |
| Reference Example 4 | 35 | 7 | 55 | 3 | 1.49 | 2.20 |
| Reference Example 5 | 35 | 10 | 52 | 3 | 1.13 | 2.80 |
| Reference Example 6 | 35 | 5 | 57 | 3 | 2.14 | 1.50 |
| Reference Example 7 | 35 | 5 | 57 | 3 | 0.83 | 1.50 |
| Comparative Example 1 | 35 | 0 | 62 | 3 | 3.72 | 2.10 |
| Comparative Example 2 | 35 | 0 | 62 | 3 | 4.58 | 0.70 |
| Comparative Example 3 | 35 | 0 | 62 | 3 | 1.56 | 0.40 |

As shown in Table 1, the laminate film of Reference Examples 1 to 7 had a stably high lamination strength. Comparing Reference Example 3 with Reference Examples 6, 7 having the same composition of the coating layer and different composition of the underlayer, difference in lamination strength was 0.5 N/15 mm. Accordingly, it was confirmed that the lamination strength of the laminate film of the Reference Examples seldom depends on the composition of the underlayer, and thereby reducing variation in lamination strength. Therefore, degree of freedom in material selection for the underlayer can be increased.

On the other hand, in the case of Comparative Examples 1 to 3 in which the coating layer does not contain silane coupling agent, comparing Comparative Example 1 with Comparative Examples 2, 3 having the same composition of the coating layer and different composition of the underlayer, difference in lamination strength was 1.4 to 1.7 N/15 mm. Accordingly, it was confirmed that the lamination strength of the laminate film of Comparative Examples significantly vary depending on the variation of underlayer. That is, it was confirmed that the lamination strength of the laminate film significantly depends on the composition of the underlayer. In addition, it was confirmed that the laminate film of Reference Examples 2 to 7 also had sufficiently high oxygen barrier properties.

Example 1

For evaluation of tear strength, seal strength and oxygen permeability of the laminate film having the configuration shown in FIG. 1, a laminate film B having the same configuration as that of laminate film 100 of FIG. 1 was manufactured as below. First, a resin substrate A having heat seal characteristics was prepared. This resin substrate A was a 20 μm thick biaxially stretched polypropylene film (second layer) having an approximately 3 μm thick heat seal layer (first layer) on one surface, and a multi-layered laminate including a heat seal layer on the outermost layer made of a copolymer of comonomer containing propylene and ethylene and a main substrate of polypropylene resin is biaxially stretched to a predetermined thickness. The tear strength of the resin substrate A by the Elmendorf method was MD: 48.7 mN and TD: 24.5 mN.

An underlayer was formed on the surface of the resin substrate A on which the heat seal layer was not formed. As a liquid mixture for forming an underlayer, a liquid mixture A (solid content: 2 mass %) was prepared by mixing γ-isocyanate propyl trimethyl silane, acryl polyol, and aliphatic xylene diisocyanate with a diluting solvent (ethyl acetate) at a mass ratio of 11:53:37. The liquid mixture A was coated by gravure coating on the surface of the resin substrate A on which the heat seal layer was not formed. After coating, the liquid mixture A was dried to form an underlayer on one surface of the resin substrate A.

Then, a coating layer was laminated on the surface of the underlayer of the resin substrate A. As a liquid mixture for forming a coating layer, a liquid mixture B was prepared by mixing four components of polyvinyl alcohol (PVA, the number-average molecular weight: 75,000), γ-glycidoxypropyltrimethoxy silane (GPTMS), tetra tetraethoxy silane (TEOS), and montmorillonite (Mon.) with water at the same mass ratio as Reference Example 3 in Table 1. The liquid mixture B was coated on the underlayer by gravure coating. After coating, the liquid mixture B was heated and dried to thereby form a coating layer on the underlayer. Thus, a laminate film B was produced. The thickness of the underlayer of the laminate film B was approximately in the range of 60 to 70 nm, and the thickness of the coating layer was approximately in the range of 0.4 to 0.6 μm.

Example 2

For evaluation of tear strength, seal strength and oxygen permeability of the laminate film having the configuration shown in FIG. 5, a laminate film D having the same configuration as that of laminate film 120 of FIG. 5 was manufactured as below. As a substrate C (substrate 60 in FIG. 5) to be bonded to the laminate film B to form the laminate film D, a biaxially stretched polypropylene film (manufactured by Mitsui Chemicals Tohcello Inc, trade name: U1, thickness: 20 μm) was prepared. The tear strength of the resin substrate C by the Elmendorf method was MD: 51.6 mN and TD: 26.1 mN. The coating layer of the laminate film B and the substrate C were bonded to each other via a two-liquid curing type urethane-based adhesive to obtain the laminate film D.

The evaluation results for the laminate films B, D were shown in Table 2. Further, the seal strength in Table 2 was the value for the sample obtained by sealing the heat sealing surfaces of the laminate films under the seal conditions of 140° C. and 0.2 MPa/sec.

Comparative Example 4

The laminate film was formed in the same manner as Example 1 except that the laminate substrate described below was used instead of the resin substrate A having heat seal properties. That is, in this Comparative Example, a laminate substrate made up of a biaxially stretched polypropylene film (manufactured by Mitsui Chemicals Tohcello Inc, trade name: U1, thickness: 20 μm) and an unstretched polypropylene film (manufactured by Mitsui Chemicals Tohcello Inc, trade name: GLC #30, thickness: 30 μm) was used. The evaluation results for the laminate film of this Comparative Example were shown in Table 2.

TABLE 2

| No. | Seal strength (N/15 mm) | Elmendorf tear strength (mN) | | Oxygen permeability (ml/m$^2$/day) |
|---|---|---|---|---|
| | | MD | TD | |
| Example 1 | 2.8 | 48.7 | 24.5 | 4.6 |
| Example 2 | 2.8 | 125 | 74.5 | 2.6 |
| Comparative Example 4 | 24.7 | 195 | 431 | 2.2 |

As shown in Table 2, the seal strength and tear strength of the laminate film of Examples 1, 2 were sufficiently low compared with the laminate film of Comparative Example 4. The laminate film of Examples 1, 2 also had sufficiently high oxygen barrier properties. It was confirmed that the laminate film of Examples 1, 2 was useful for efficiently procuring packaging bags that can be easily open by hand and have gas barrier properties.

INDUSTRIAL APPLICABILITY

The present disclosure provides a laminate film useful for efficiently producing packaging bags that can be easily opened by hand and have gas barrier properties, and a packaging bag produced by using the same.

REFERENCE SIGNS LIST

10 . . . Resin substrate; 10a . . . First layer; 10b . . . Second layer; 10s . . . Heat sealing surface; 20 . . . Underlayer; 30 . . . Coating layer; 40 . . . Ink layer; 50 . . . Vapor deposition layer; 60 . . . Substrate; 100; 120 . . . Laminate film; 200 . . . Packaging bag; 211 . . . Seal portion; 214 . . . Side end; 215 . . . Non-seal portion; 216 . . . Lower end; 217 . . . Upper end; 218 . . . Accommodating portion; 220 . . . Opening means; 221 . . . Half cutting line; 224 . . . Easy-opening processing section; 230 . . . Re-sealing means

What is claimed is:

1. A laminate film for packaging, comprising:
   a resin substrate having a heat sealing surface that constitutes one outermost surface of the laminate film;
   a coating layer made of a non-metallic material; and
   an underlayer disposed between the resin substrate and the coating layer,
   wherein the resin substrate includes a first layer that is made of olefin copolymer having a melting point on a range of 80 to 120° C. and a thickness in a range of 0.5 to 5 μm and constitutes the heat sealing surface, and a second layer made of polypropylene having a thickness in a range of 15 to 50 μm, and the first and second layers are laminated and biaxially stretched.

2. The laminate film of claim 1, further comprising an ink layer directly laminated on a surface of the coating layer.

3. The laminate film of claim 1, further comprising a vapor deposition layer disposed between the underlayer and the coating layer.

4. The laminate film of claim 1, wherein a tear strength by the Elmendorf method is in a range of 10 to 200 mN.

5. The laminate film of claim 1, wherein the coating layer has transparency to visible light.

6. The laminate film of claim 1, wherein the coating layer includes a water-soluble polymer, at least one of silane coupling agent and a hydrolysate thereof, at least one of metal alkoxide and a hydrolysate thereof, and an inorganic layered compound.

7. The laminate film of claim 1, wherein a lamination strength is in a range of 1.0 to 4.0 N/15 mm.

8. The laminate film of claim 1, wherein the underlayer includes an organic polymer as a main component.

9. The laminate film of claim 8, wherein the organic polymer includes at least one selected from polyols, organic silane compounds, aqueous polyurethane resins, and reaction products of the polyols and the organic silane compounds.

10. A packaging bag formed by bonding films, wherein the film includes the laminate film of claim 1.

11. The laminate film of claim 1, wherein the olefin copolymer is a propylene copolymer.

* * * * *